July 8, 1969    P. TAIRRAZ    3,454,290
ADAPTER FOR FLEXIBLE TUBING
Filed Nov. 16, 1967

United States Patent Office 3,454,290
Patented July 8, 1969

3,454,290
ADAPTER FOR FLEXIBLE TUBING
Paul Tairraz, Cluses, France, assignor to Ets. Carpano & Pons, Cluses, France, a company of France
Filed Nov. 16, 1967, Ser. No. 683,570
Claims priority, application France, Nov. 21, 1966, 84,335
Int. Cl. F16l 31/00, 47/00
U.S. Cl. 285—249                                  3 Claims

ABSTRACT OF THE DISCLOSURE

An adapter for joining flexible tubes having an outer threaded sleeve, an inner sleeve, and a central member connecting the inner and outer sleeves. A flexible tube is positioned in the space between the sleeves and a threaded member having an internal chamfered portion is screwed over the outer sleeve. Between the flexible tube and the threaded member is positioned a ring having a plurality of flexible arms extending therefrom and terminating in wedges which have radial extremities which fit in the chamfered portion. The flexible arms abut against an annular axially extending projection on the inner end of the inner sleeve and upon tightening of the threaded member on the outer sleeve the arms pivot about the projection and engage the tube.

---

The present invention relates to a rapidly connected adapter for flexible tubing, in particular for hoses made of plastic material, of rubber or having a core made of textile material covered by rubber or plastic material or enveloped in a material of this type. There already exist rapidly made adapters permitting to assemble two lengths of tube and which are, for example, constituted by a symmetrical part formed of an outwardly threaded core extended on its two sides by a conical sleeve on which is slipped on the tube which is then tightened by a screw which screws on the tube and is prolonged by a conical inner sleeve forming a tip. This device is, however, only useful for very flexible tubes of a very precise outer diameter, failing which the tightening cone cannot be screwed on the core if the tube is too large and is not effective if the diameter of the tube is too small, which constitutes a severe disadvantage since there exists a large variety of tubes which for an identical inner diameter have different outer diameters. In a known adapter of another kind, the screw has a conical ramp along which can slide an extensible tightening ring constituted by a cylindrical spring the coils of which thus tighten against the tube or hose. However, ths adapter gives too loose a connection in the case of thick and rigid plastic hoses which have a low coefficient of friction. Additionally, the spring rusts rather rapdly and makes difficult the removal of the tube or hose.

The object of the present invention is to provide an adapter or connection which obviates all the above enumerated disadvantages of prior art construction.

This and other objects, features, and advantages of the present invention will be more readily realized as the description thereof proceeds in particular when taken in conjunction with the accompanying drawing which shows the preferred mode of carrying out the invention and in which.

Figure 1:
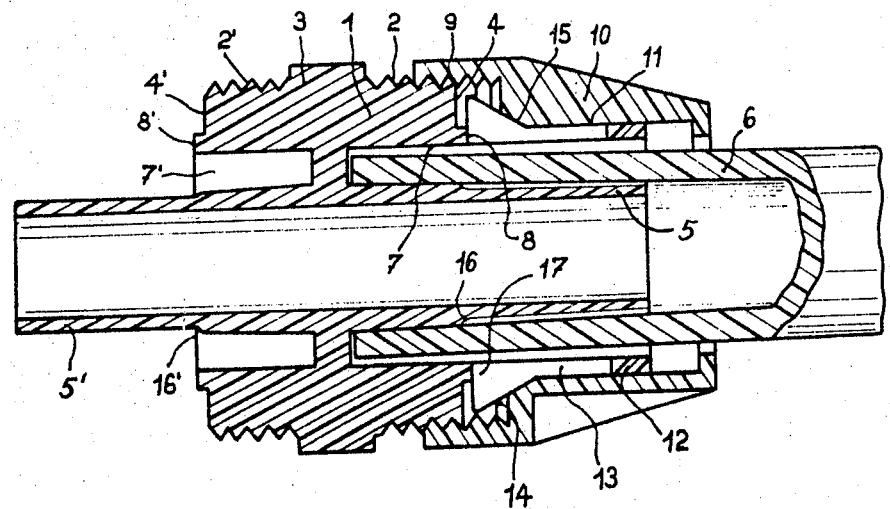
FIGURE 1 shows a cross sectional axial view of an adapter in assembled position, before tightening, a single hose and a single screw having been shown in order to simplify the drawing.

The adapter according to the invention is characterized by the provision of a ring in between the tube to be connected and a sleeve screwed on the body of the connector, the ring having a plurality of gripping members which can pivot into engagement with the tube upon tightening of the sleeve surrounding the same on the body of the adapter.

The adapter shown in the drawing is made entirely of moulded plastic material, which represents a substantial advantage from the point of view of wear and upkeep; however, the parts constituting the adapter can be made of any other material, in particular of a moulded alloy and the elastic clamp can in any case be made of steel, since the same does not tend to stick to the adapter even in the case of rust.

As shown in the drawing, the adapter comprises a symmetrical sleeve or core 1, having external threads 2, 2' on either side of a central ring 3 which can be knurled or of polygonal cross section to facilitate handling during the tightening. On its side faces 4, 4', the core has tips 5, 5' which can be slightly conical in order to facilitate branching of the hose 6. Deep annular grooves 7, 7' are formed concentrically to tips 5, 5', on the sides 4, 4' of the core, the inner diameter of these grooves being slightly greater than the outer diameter of the tip, in order to form a slight shoulder 16, 16' the purpose of which will appear later. The outer diameter of the groove is sufficiently large to permit the introduction of a hose 6 of any type, the inner diameter of which is adapted to that of the tip. Concentrically to grooves 7, 7', sides 4, 4' of the core have circular projections 8, 8'. On the thread 2 of the core can screw a nut 9 extending into a sleeve 10 of suitable external shape, for example, conical and having a cylindrical bore 11 of a large diameter, thus leaving a large space free between the sleeve and the hose. In the cylindrical bore 11 of sleeve 10 is mounted, slidingly, an elastic clamp constituted by a ring 12 having several flexible arms 13, 13', 13", the ends of which have wedges or ramps 14, 14', 14", conically shaped, for example. The inner edge 15 of bore 11 of sleeve 10 is chamfered in order to adapt to the ramps 14, 14', 14" of arms 13, 13', 13".

Figure 2:
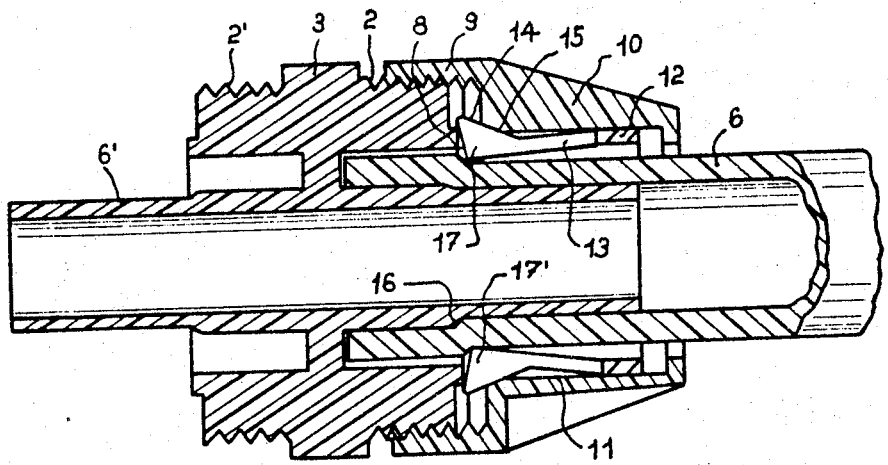
FIGURE 2 shows the same adapter after tightening the hose.
Figure 3:
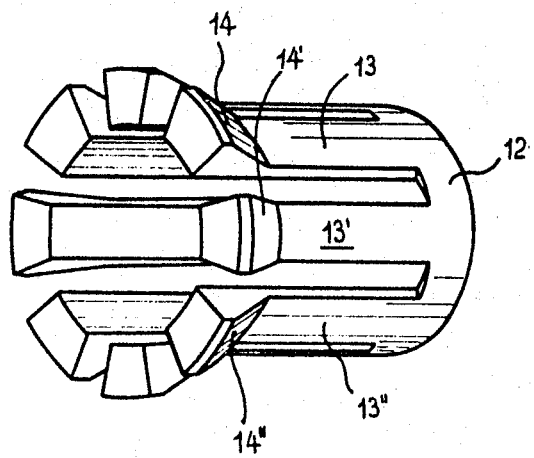
FIGURE 3 is a perspective view of the elastic clamp.

Clamp 13–14 being introduced in nut 9–10–11, this assembly is threaded on hose 6, the extremity of which slips on tip 5 and is inserted in groove 7. Nut 9 is then screwed on the thread 2 of core 1 and chamfer 15 pushes forward the clamp which stops against the circular projection 8 of side 4 of the core. By continuing to screw the nut, the chamber 15 pushes inwardly ramp 14, 14', 14" of flexible arms 13, 13', 13", which tighten against shoulder 16: the deformation thus given to the hose, as shown in FIGURE 2, ensures perfect tightening of the hose against heels 17, 17', 17" of flexible arms 13, 13', 13" and shoulder 16 of the tip, thus making impossible the removal of the hose by pulling without previously loosening the nut.

The use of judiciously chosen plastic materials for the different parts permit to eliminate all wear of parts which slide against one another because of the low coefficient of friction of these materials and their lack of sensitivity to humidity.

What is claimed is:

1. An adapter for flexible tubes comprising a first sleeve comprising an end wall, and outer threads on either side of a central ring, said sleeve having an inner hollow, elongated member, said member extending from both sides of said ring and being spaced from the inner walls of said sleeve; said member having ends adapted to fit in tubes to be connected, said ring forming stops for said tubes; a second sleeve having an internal thread and an inner diameter such as to leave a space between its inner bore and one of said tubes, and a chamfered portion ajdacent said threads; elastic gripping members fitting in said space over said tube, said members having an annular ring portion with a plurality of flexible arms extending therefrom and terminating in wedges having radial extremities fitting in said chamfered portion; said first sleeve having annular projections extending axially from the inner portion of said end wall, said projections having radial end surfaces serving as end stops for said wedges whereby upon tightening said second sleeve on said first sleeve, said radial extremities abut said end stops to pivot said wedges about said annular projections and into engagement with said tube.

2. Adapter according to claim 1, wherein said wedges are frusto-conically shaped.

3. Adapter according to claim 1, wherein said first sleeve has a polygonal cross-section separating said outer threads, to facilitate handling of said adapter.

References Cited

UNITED STATES PATENTS

| 2,365,747 | 12/1944 | Cowles | 285—249 |
| 2,470,538 | 5/1949 | Wolfram et al. | 285—249 |
| 2,541,200 | 2/1951 | Brubaker | 285—249 |
| 3,218,094 | 11/1965 | Bauer | 285—249 |
| 3,265,412 | 8/1966 | Reid et al. | 285—423 X |

FOREIGN PATENTS 762,967  12/1956  Great Britain.

THOMAS F. CALLAGHAN, *Primary Examiner.*

U.S. Cl. X.R.

285—323, 382.7, 398